United States Patent
Thyamagondlu et al.

(10) Patent No.: US 10,983,920 B2
(45) Date of Patent: Apr. 20, 2021

(54) CUSTOMIZABLE MULTI QUEUE DMA INTERFACE

(71) Applicant: Xilinx, Inc., San Jose, CA (US)

(72) Inventors: Chandrasekhar S Thyamagondlu, Sunnyvale, CA (US); Darren Jue, Sunnyvale, CA (US); Tao Yu, Campbell, CA (US); John West, Erie, CO (US); Hanh Hoang, Hayward, CA (US); Ravi Sunkavalli, San Jose, CA (US)

(73) Assignee: XILINX, INC., San Jose, CA (US)

( * ) Notice: Subject to any disclaimer, the term of this patent is extended or adjusted under 35 U.S.C. 154(b) by 131 days.

(21) Appl. No.: 15/892,266

(22) Filed: Feb. 8, 2018

(65) Prior Publication Data
US 2019/0243781 A1    Aug. 8, 2019

(51) Int. Cl.
*G06F 12/1081*    (2016.01)

(52) U.S. Cl.
CPC .... *G06F 12/1081* (2013.01); *G06F 2212/621* (2013.01); *G06F 2213/28* (2013.01)

(58) Field of Classification Search
CPC .......... G06F 12/1081; G06F 2212/621; G06F 2213/28
USPC ............ 711/112; 710/112; 712/112; 714/112
See application file for complete search history.

(56) References Cited

U.S. PATENT DOCUMENTS

| | | | |
|---|---|---|---|
| 6,081,852 A * | 6/2000 | Baker | G06F 13/28 375/E7.025 |
| 6,202,106 B1 | 3/2001 | Baxter | |
| 6,370,601 B1 | 4/2002 | Baxter | |
| 6,772,245 B1 * | 8/2004 | Pomerantz | G06F 13/385 709/233 |
| 6,807,587 B1 | 10/2004 | Murray et al. | |
| 7,139,848 B1 | 11/2006 | Murray et al. | |
| 7,225,278 B1 * | 5/2007 | Baxter | G06F 13/28 710/22 |
| 7,536,669 B1 | 5/2009 | Anderson | |
| 7,831,801 B1 | 11/2010 | Anderson | |
| 2009/0019206 A1 * | 1/2009 | Engel | H04L 49/40 710/305 |

* cited by examiner

*Primary Examiner* — Charles Rones
*Assistant Examiner* — Han V Doan
(74) *Attorney, Agent, or Firm* — Patterson + Sheridan, LLP

(57) ABSTRACT

Examples herein describe techniques for providing a customizable direct memory access (DMA) interface which can permit user logic to change or control how DMA read and writes are performed. In one example, a DMA engine may be hardened (e.g., include circuitry formed from a semiconductor material) which prevents the DMA engine from being reconfigured like programmable logic. Instead of changing the DMA engine, the user logic can change or customize the DMA interface between the user logic and the DMA engine. In this way, the manner in which the DMA engine performs DMA write and reads can be changed by the user logic. In one example, the DMA engine includes a bypass mode of operation where descriptors associated with DMA queues are passed through the DMA engine and to the user logic.

20 Claims, 8 Drawing Sheets

CUSTOMIZABLE MULTI QUEUE DMA INTERFACE

TECHNICAL FIELD

Examples of the present disclosure generally relate to a customizable DMA interface for supporting different operational modes.

BACKGROUND

Direct memory access (DMA) permits hardware subsystems such as a periphery device to access main memory (e.g., RAM) without relying on the central processing unit. The hardware subsystem includes a DMA engine for performing DMA read and writes between memory in the host computing system and memory in the hardware subsystem. However, it is difficult if not impossible to design a DMA engine that meets all the needs of various applications that may use DMA. Moreover, the functions performed by the DMA engine may be fixed or inflexible which means different applications may not be supported by the DMA engine.

SUMMARY

Techniques for performing DMA operations are described. One example is a computing system that includes a host comprising a direct memory access (DMA) queue storing a plurality of descriptors and a periphery device communicatively coupled to the host to enable DMA operations. The periphery device includes a DMA engine, user logic, and a DMA interface comprising signals communicatively coupling the DMA engine to the user logic. In a bypass mode of operation, the DMA engine is configured to forward, using the DMA interface, a first descriptor of the plurality of descriptors received from the host to the user logic. Moreover, the user logic evaluates the first descriptor to determine whether the first descriptor contains one of: a payload corresponding to a first DMA operation and a memory pointer to the payload.

One example described herein is a periphery device that includes a DMA engine including circuitry, user logic, and a DMA interface including signals communicatively coupling the DMA engine to the user logic. In a bypass mode of operation, the DMA engine is configured to forward, using the DMA interface, a first descriptor received from a host to the user logic. Moreover, the user logic evaluates the first descriptor to determine whether the first descriptor contains one of: a payload corresponding to a first DMA operation and a memory pointer to the payload.

One example described herein is a method that includes receiving a first descriptor from a host at the DMA engine, forwarding, in a bypass mode of operation, the first descriptor from the DMA engine to user logic using a DMA interface, and determining at the user logic whether the first descriptor contains one of: a payload corresponding to a first DMA operation and a memory pointer to the payload.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
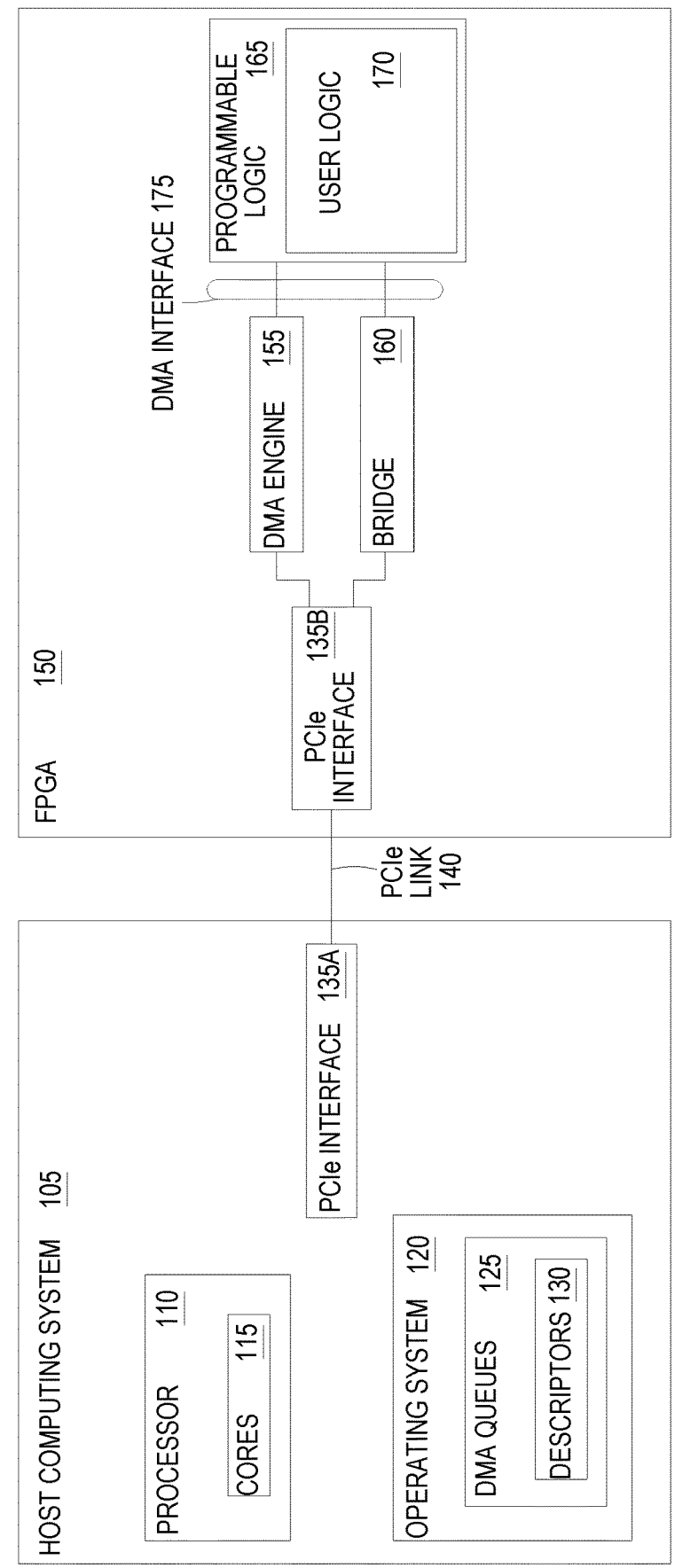
FIG. 1 is a block diagram of a computing system implementing DMA, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for providing a customizable DMA interface (e.g., an application program interface (API)), which can permit user logic to change or control how DMA read and writes are performed. In one example, a DMA engine may be hardened (e.g., include circuitry formed from a semiconductor material) which prevents the DMA engine from being reconfigured like programmable logic. Instead of changing the DMA engine, the user logic can change or customize the DMA interface between the user logic and the DMA engine using programmable logic (PL). In this way, the manner in which the DMA engine performs DMA write and reads can be changed by the user logic.

In one example, the DMA engine includes a bypass mode of operation where descriptors associated with DMA queues are passed through the DMA engine and to the user logic. Stated differently, the descriptors bypass the DMA engine and pass through the DMA interface to the user logic. This enables the user logic to control various aspects of performing DMA such as customizing the descriptors, managing traffic, performing address translation, and assigning user space DMA. The user logic can customize the DMA interface to aid the user logic in performing some or all of these functions.

FIG. 1 is a block diagram of a computing system 100 implementing DMA, according to an example. The computing system 100 includes a host computing system 105 and a field programmable gate array (FPGA) 150, which use DMA to transfer data between memory. That is, an operating system 120 in the host computing system 105 can perform a DMA read/write on memory in the FPGA 150 and user logic 170 (also referred to a receiving logic which can include programmable logic or non-programmable logic) in the FPGA 150 can perform a DMA read/write on memory in the host computing system 105. In one embodiment, the FPGA 150 includes hardened circuitry as well as programmable circuitry or logic.

As shown, the host computing system (also referred to a simply "the host") 105 includes a processor 110, the operating system 120, and a Peripheral Component Interconnect Express (PCIe) interface 135A. The processor 110 can represent any number of different processing elements. In this example, the processor 110 includes multiple cores. Each of the cores 115 can operate independently of each other. For example, one of the cores 115 may execute a first application or operating system 120 while a second one of the cores 115 executes a second application or operating system 120.

The operating system 120 includes a plurality of DMA queues 125 that permit the host 105 and the FPGA 150 to perform DMA. The DMA queues 125 store descriptors 130 which, in one example, include pointers used to identify available memory for performing DMA read and writes. For example, the operating system 120 can indicate portions of memory available for storing payloads that are moved between the host 105 and the FPGA 150 using the descriptors 130. In one example, the queues 125 establish a descriptor ring, which includes indices indicating available descriptors when performing DMA. In one example, the DMA queues include at least one transmit (TX) queue for transmitting data from the host 105 to the FPGA 150 and at least one receive (RX) queue for transmitting data from the FPGA 150 to the host 105.

In one example, each of the cores 115 is assigned a respective one of the DMA queues 125. In such a scenario, the DMA engine 155 can be a multi queue DMA engine 155 that permits multiple independent flows. That is, each core 115 has its own queue 125 so the cores 115 do not need to wait for a lock to send or receive data. That is, the cores 115 can transmit non-blocking data and can operate in parallel with no, or very little, coordination. In another embodiment, instead of assigning a core 115 to one of the queues 125, different applications executed by the cores 115 are assigned to different DMA queues 125 or a virtual core in a virtualized environment can be assigned to the DMA queues 125.

The PCIe interface 135A permits the host 105 to communicate with the FPGA 150 using PCIe serial communication. A PCIe link 140 enables the PCIe interface 135A in the host 105 to communicate with a PCIe interface 135B on the FPGA 150. However, the present examples are not limited to PCIe communication for performing DMA read and writes and other high-speed data communication techniques can be used.

The FPGA 150 includes the PCIe interface 135B, the DMA engine 155, a bridge 160, a DMA interface 175, and programmable logic 165. In one embodiment, the DMA engine 155 permits hardware subsystems (e.g., the user logic) to access, for example, main memory in the host 105 independent of the central processing unit (CPU) in the host 105. In one example, the DMA engine 155 is a hardened DMA engine that includes at least some circuitry that is non-configurable. That is, the DMA engine 155 include non-programmable logic or circuitry rather that programmable circuitry—e.g., programmable logic 165. For example, the DMA engine 155 may include semiconductor circuits whose functions are set and cannot be reconfigured. One advantage of forming a hardened DMA engine 155 is that the programmable logic 165 in the FPGA 150 can be dedicated for use by the user rather than having to use a portion of the programmable logic 165 to form the DMA engine 155. However, the examples described herein can be used with programmable (or soft) DMA engines as well as hardened DMA engines. Put differently, the customizable DMA interface 175 can be used with soft or hardened DMA engines 155.

The DMA interface 175 defines signals and data paths for transmitting data between the DMA engine 155 and the programmable logic 165, which includes the user logic 170. For example, the user may configure the programmable logic 165 to generate the user logic 170 that can perform any number of functions such as a network interface card (NIC), neural network accelerator, a graphics accelerator, a cryptography accelerator, Open CL, circuit emulation, data mining, etc. The programmable logic 165 may include logic blocks such as configurable logic blocks (CLBs). Moreover, although not shown, the FPGA 150 may include other specialized hardware blocks such as digital signal processing (DSP) blocks for performing specific data processing.

The bridge 160 is a switching element that permits the user logic 170 to bypass the DMA engine 155 to communicate directly with the host 105. For example, the user logic 170 may use the bridge 160 when performing other functions besides a DMA read or write.

As mentioned above, the DMA interface 175 is customizable by the user logic 170 so that the user logic 170 can change or alter how DMA is performed. That is, the user logic 170 can change what signals and features it uses that are made available by the DMA interface 175 (e.g., an API). In one example, the DMA interface 175 permits the user logic 170 to set different modes of operation, e.g., a normal mode of operation and a bypass mode of operation. Moreover, as needed, the user can reconfigure the user logic 170 to perform different tasks when performing DMA. That is, some of the functions that were previously performed by the DMA engine 155 can be offloaded using the DMA interface 175 to the user logic 170. As such, the user logic 170 can perform the tasks that would previously be performed solely by the DMA engine 155 such as customizing the descriptors, managing traffic, performing address translation, and assigning user space DMA.

In one example, the FPGA 150 is disposed within the same body or case as the host 105. For example, the FPGA 150 may be a hardware card that is plugged into a PCIe connector in a motherboard in the host 105. However, in other examples, the FPGA 150 is external to the case containing the host 105. Moreover, the examples herein are not limited to an FPGA 150 and can be used in a graphics processor unit (GPU) coupled to the host 105 or other periphery devices.

Figure 2:
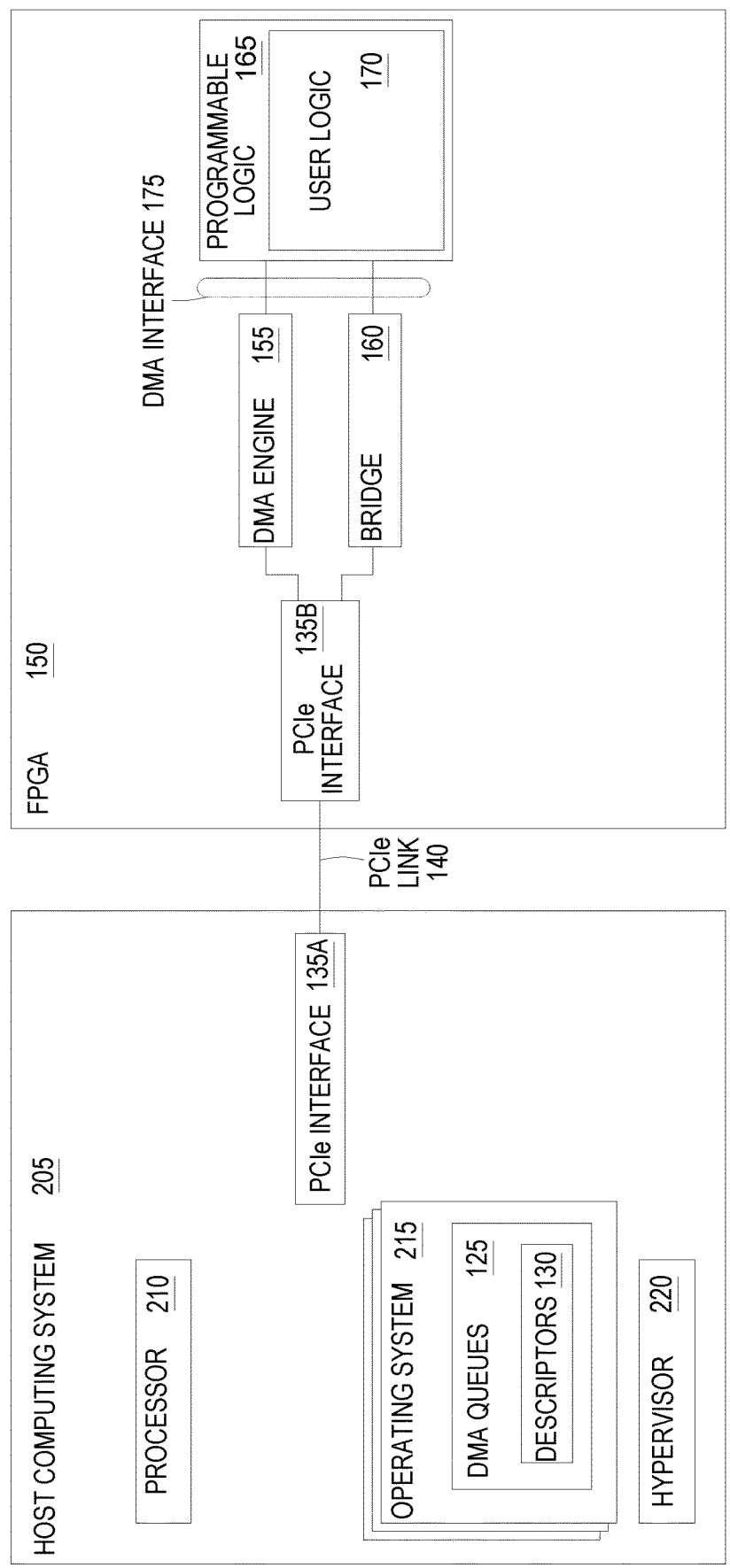
FIG. 2 is a block diagram of a computing system implementing DMA, according to an example.

FIG. 2 is a block diagram of a computing system implementing DMA, according to an example. The computing system includes a host computing system 205 and the FPGA 150, which is the same as the FPGA 150 discussed in detail in FIG. 1, and thus, will not be described again here.

The host 205 includes a processor 210, multiple operating systems 215, a hypervisor 220 and the PCIe interface 135A. The processor 210 represents any number of processing elements which each can include any number of processing cores. The operating system 215 may be part of different virtual machines managed by the hypervisor 220. That is, the hypervisor 220 permits the hardware elements (e.g., the processor 210, PCIe interface 135A, memory, etc.) in the host 205 to be virtualized. In one example, each operating system 215 is assigned at least one DMA queue 125 for performing DMA read and writes. Thus, instead of assigning each core a DMA queue like in FIG. 1, in FIG. 2, each operating system 215 (or each virtual machine) is assigned a DMA queue 125. As such, the applications executed by each operating system 215 can perform DMA read and write using the multi queue DMA engine 155 without waiting for a lock or sharing a queue with another operating system or virtual machine. The operating systems 215 can perform DMA read and writes in parallel with no, or very little, coordination.

The examples herein can be applied to other multi-queue scenarios besides assigning each core 115 to a queue 125 as shown in FIG. 1 or assigning each operating system 215 to a queue 125 as shown in FIG. 2. For example, different applications in an operating system 215 may use different queues 125 for performing DMA in parallel. In another example, different threads can be assigned respective DMA queues 125.

Figure 3:
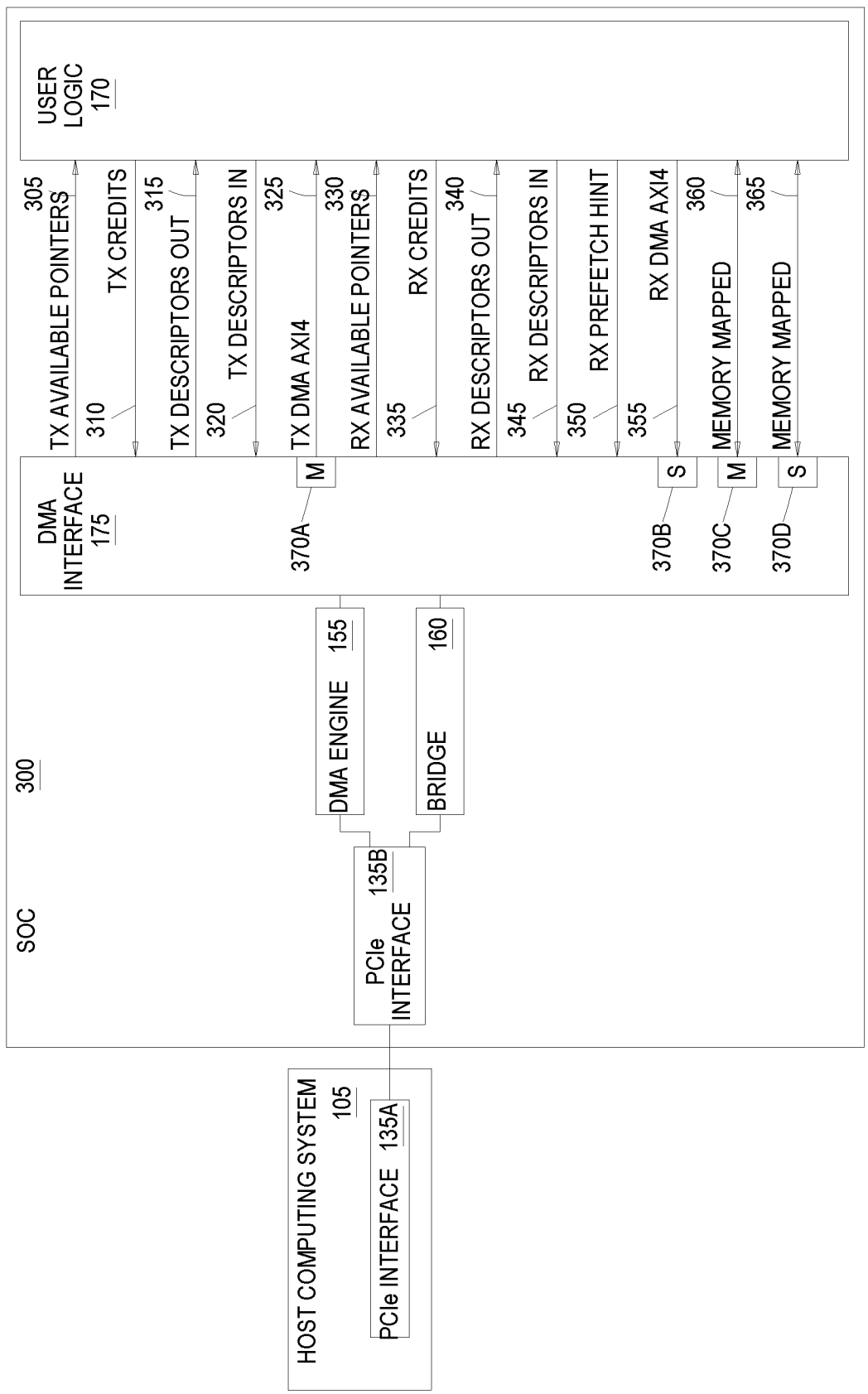
FIG. 3 illustrates a customizable DMA interface, according to an example.

FIG. 3 illustrates the customizable DMA interface 175, according to an example. As shown, the host 105 is coupled to a system on a chip (SOC) 300 which can be a NIC, FPGA, GPU, ASIC or other hardware card or external device. Moreover, although not shown, the SOC 300 can include one or more processors or network components which can use the DMA engine 155 to transmit and read data stored in the memory of the host 105. That is, instead of using the DMA engine 155 to transmit data between the host and the user logic 170, the techniques herein can be used to transmit data between the host 105 and other hardware components in the SOC 300 regardless if these components are programmable or non-programmable. Using respective PCIe interfaces 135, the host 105 can write data to, and receive data from, memory in the SOC 300 using DMA. Conversely, the SOC 300 can write data to, and receive data from, memory in the host 105 using DMA.

The DMA interface 175 includes different signals or sub-interfaces which transmit data between the DMA engine 155 and the user logic 170. The user logic 170 may be part of programmable logic but this is not a requirement, and instead could be hardened and still benefit from having a customizable DMA interface 175.

The TX available pointers signal 305 indicates the number of available pointers or available descriptors in a DMA queue. Stated differently, the signal 305 indicates the number of descriptors that the user logic 170 can use to perform DMA writes from the host 105 to the memory in the SOC 300. In one example, the DMA engine 155 receives the number of available points from the host 105 (e.g., an operating system in the host 105) and then forwards this information to the user logic 170 using the TX available pointers signal 305.

The TX credits signal 310 is provided by the user logic 170 to the DMA interface. In one example, the user logic 170 determines, based on the TX available pointers, the number of DMA writes and reads it can handle or perform. For example, the DMA queue may have one hundred available pointers but the user logic 170 can currently handle only ten. As such, the user logic 170 may issue only ten credits to the DMA interface using the TX credits signal 310. In this manner, the user logic 170 (in addition to, or instead of, the DMA engine 155) can perform traffic management to increase or decrease the DMA read and writes.

The TX descriptors out signal 315 provides descriptors to the user logic 170. In one example, the DMA engine 155 and interface 175 operate in a bypass mode of operation where the descriptors fetched by the DMA engine 155 from the queues is transmitted to the user logic for processing in contrast to a normal mode of operation where the DMA engine 155 processes the descriptors. The descriptors can include pointers to memory that store a payload corresponding to a received packet that the host 105 wants to store in the memory of the SOC 300. Alternatively, instead of containing a pointer to the payload, the payload is stored in the descriptor. That is, the descriptor itself stores the payload which is referred to herein as having immediate data. In one example, the DMA format is fixed which means it is difficult to predict how the user logic 170 may implement the bypass mode to receive immediate data. Thus designing a DMA engine 155 that can satisfy current and future uses of immediate data is difficult. Instead, as described in more detail below, the examples herein use the DMA interface 175 to offload descriptor processing to the user logic 170 during the bypass mode of operation which determines whether the descriptor includes a pointer to memory containing the payload or the descriptor itself contains the payload. In one example, each DMA queue has descriptors that either contain pointers to the payload or contain the payloads themselves. When the descriptors themselves contain the payloads this is referred to herein as "immediate data." Thus, by determining which queue contains the descriptor described in the TX descriptors out 315, the user logic 170 can determine how to process the descriptor.

Once processed, the user logic 170 can use the TX descriptors in signal 320 to transmit the processed descriptor to the DMA interface 175 and then to the DMA engine 155. In one example, the user logic 170 transmits a descriptor back to the DMA engine 155 using the TX descriptors in signal 320 only if the received descriptor stores a pointer to the payload. If the descriptor stores the payload directly, the user logic 170 would already have the payload rather than requesting the DMA engine 155 to fetch the payload using the processed descriptor transmitted using the TX descriptors in signal 320. That is, when receiving a descriptor that has the payload, the user logic 170 may not transmit a processed descriptor using the TX descriptors in signal 320. In this manner, the signals in the DMA interface 175 which are used by the user logic are customizable. This allows user logic to do the traffic management such as rate limiting, Quality of Service (QoS), etc. Moreover, the TX descriptors can be streaming (e.g., AXI4 signals) or memory mapped signals. If the descriptors are memory mapped, then the descriptors are sent on the memory mapped portion of the DMA interface 175. The descriptors with the streaming format correspond to data that is written or read from the DMA interface 175 while descriptors with the memory mapped format correspond to data that is written or read from memory in a SOC (e.g., the FPGA 150). For example, a memory mapped DMA can copy to or from memory (e.g., DDR3, HBM, etc.) attached to the FPGA 150.

Once the payload is fetched, the DMA engine 155 can forward the payload to the user logic 170 using the TX DMA AXI4 signal 325. In one example, the signal 325 uses the advanced extensible interface (AXI) format to transmit the payload from the DMA engine 155 to the user logic 170. However, the examples are not limited to such and can use other types of communication protocol such as the memory mapped signals 360 and 365.

In one example, the signals 305, 310, 315, 320, and 325 are used when performing a DMA write from the host 105 to the memory in the SOC 300 (referred to herein as a TX operation). However, when performing a DMA write from the SOC 300 to the memory in the host 105 (referred to herein as a RX operation), the signals 330, 335, 340, 345, and 350 may be used.

The DMA engine 155 uses the DMA interface 175 to transmit the available pointers or descriptors for performing a RX operation to the user logic 170 via the RX available pointers signal 330. For example, the host 105 may operate different TX and RX DMA queues for performing a TX operation and a RX operation. Thus, the available pointers or descriptors for performing a TX operation (as indicated by the TX available pointers signal 305) may be different than the available pointers or descriptors for performing a RX operation (as indicated by the RX available pointers signal 330). The RX available pointers signal 330 may indicate the number of available pointers in the RX DMA queue. Stated differently, the signal 330 indicates the number of descriptors that the user logic 170 can use to perform DMA write from the SOC 300 to the memory in the host 105—i.e., a RX operation. In one example, the DMA engine 155 receives the number of available descriptors from the host 105 (e.g., an operating system in the host 105) and then forwards this information to the user logic 170 using the RX available pointers signal 330.

The RX credits signal 335 may be used by the user logic 170 to perform traffic management to control how many RX operators are performed by the DMA engine 155. For example, like with the TX credits signal 310, the user logic 170 may issue the RX credits in response to its own performance parameters such as its currently available processing power, memory usage, and the like.

The DMA engine 155 uses the RX descriptors out signal 340 to provide fetched memory pointers, for example, a RX DMA queue to the user logic 170. In turn, the user logic 170 uses the RX descriptors in signal 345 to provide processed descriptors to the DMA engine 155 that the engine 155 can then use to transmit data from the memory in the SOC 300 to the memory in the host 105.

In one example, the user logic 170 uses the RX prefetch hint signal 350 to reduce latency when performing a RX operation. For example, the RX operation may be fulfilled on demand when a packet is received and the DMA engine 155 determines how many descriptors are needed to perform DMA. However, this incurs PCIe latency (e.g., between 200 nanoseconds to several milliseconds) before the DMA write can be performed using the PCIe interfaces 135. Instead, the prefetch hint provided by the RX prefetch hint signal 350 lets the DMA engine 155 prefetch the descriptor from the RX DMA queue to avoid the PCIe latency.

The user logic 170 can use the RX DMA AXI4 signal 355 to transmit the payload of a packet for a DMA RX operation to the DMA engine 155. Using the processed descriptor received from the RX descriptors in signal 345 and the payload received from the RX DMA AXI4 signal 355, the DMA engine 155 can complete the RX operation by writing the payload to the memory in the host 105. However, in other examples, the memory mapped signals 360 and 365 can be used to transfer the payload from the user logic 170 to the host 105 rather than using the RX DMA AXI4 signals 355.

DMA reads can be performed similar to the DMA write operations discussed above. For example, performing an RX operation where data is transferred from the SOC 300 to the host 105 can be either a DMA write initiated by the user logic 170 or a DMA read initiated by the host 105. Similarly, performing a TX operation where data is transferred from the host 105 to the SOC 300 can be either a DMA write initiated by the host 105 or a DMA read initiated by the user logic 170.

Moreover, the DMA interface 175 includes master (M) and servant (S) ports or connections 370. For example, the connections 370A and 370C are master connections while the connections 370B and 370D are servants. In one example, the master connections 370 are for driving (or storing) data onto the SOC 300 while the servant connections 370 are used when receiving data from the SOC 300.

If the TX descriptor in signal 320 was memory mapped, then the fetched data by the DMA engine 155 is returned to memory—e.g., DDR memory in the user logic 170.

Figure 4:
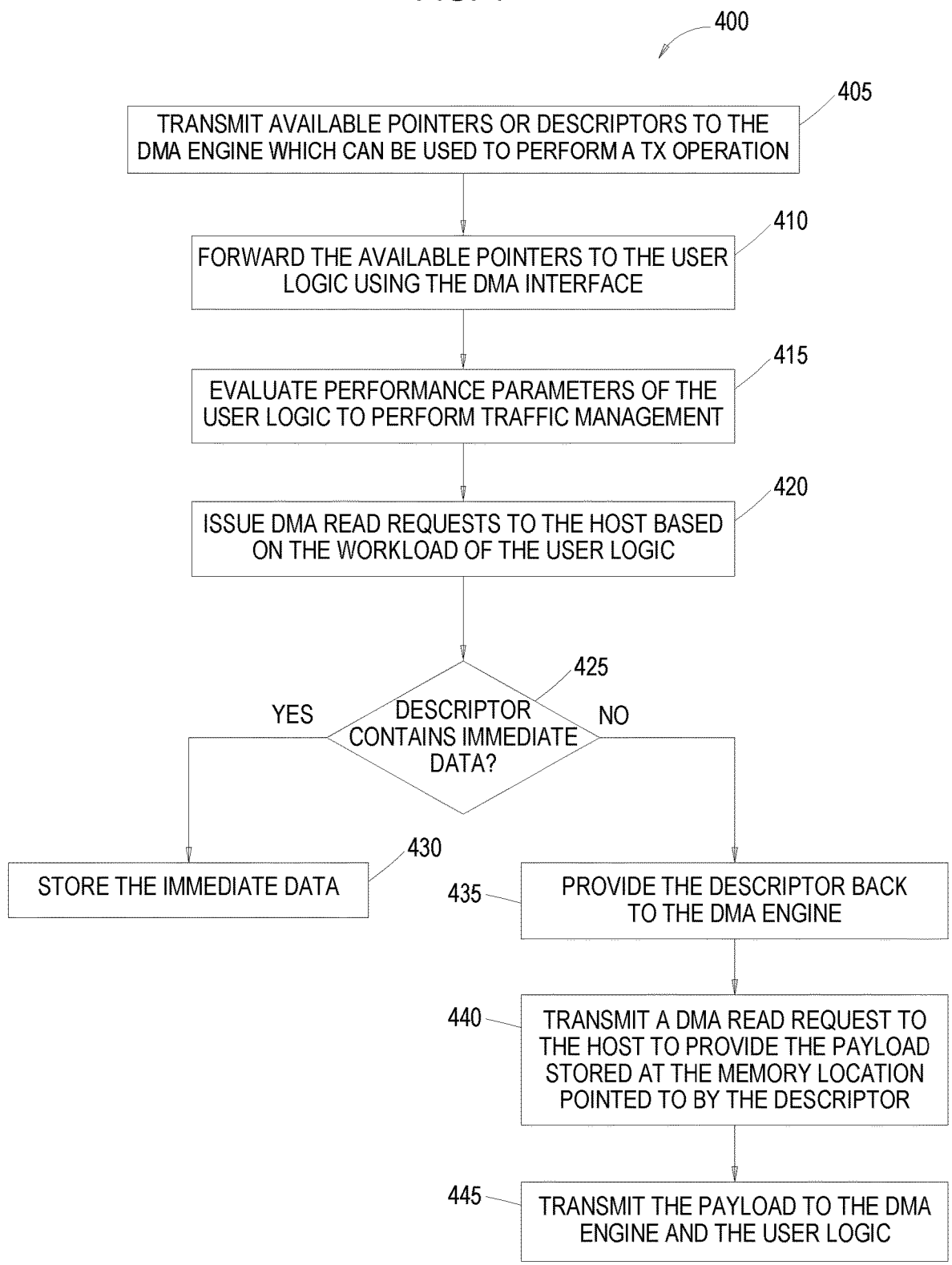
FIG. 4 illustrates a flow for performing a DMA write from a host to user logic, according to an example.

FIG. 4 illustrates a flow 400 for performing a DMA write from a host to user logic—i.e., a TX operation—according to an example. At block 405, the host transmits available pointers (or available descriptors) for a DMA queue to the DMA engine which can be used to perform a TX operation. At block 410, in a bypass mode of operation, the DMA engine forwards the available pointers to the user logic using the DMA interface. At block 415, the user logic evaluates performance parameters such as its current workload, available processing power, memory usage, descriptor storage space, and the like to perform traffic management to ensure the user logic does not receive more data from the host than the user logic can currently process.

Based on the workload of the user logic, at block 420 the DMA engine issues DMA read requests to the host which in response, fetches the descriptors that correspond to the DMA read request transmitted by the DMA engine. The DMA engine forwards the fetched descriptors to the user logic when in the bypass mode of operation.

At block 425, the user logic determines if the descriptors contain immediate data. If so, at block 430, the user logic stores the immediate data payload thereby completing the DMA operation. However, if not, the method 400 proceeds to block 435 where the user logic provides the descriptor back to the DMA engine. At block 440, the DMA engine transmits a DMA read request to the host to provide the payload stored at the memory location pointed to by the descriptor. At block 445, the host completes the DMA TX operation by transmitting the payload to the DMA engine which then sends the payload to the user logic.

Figure 5:
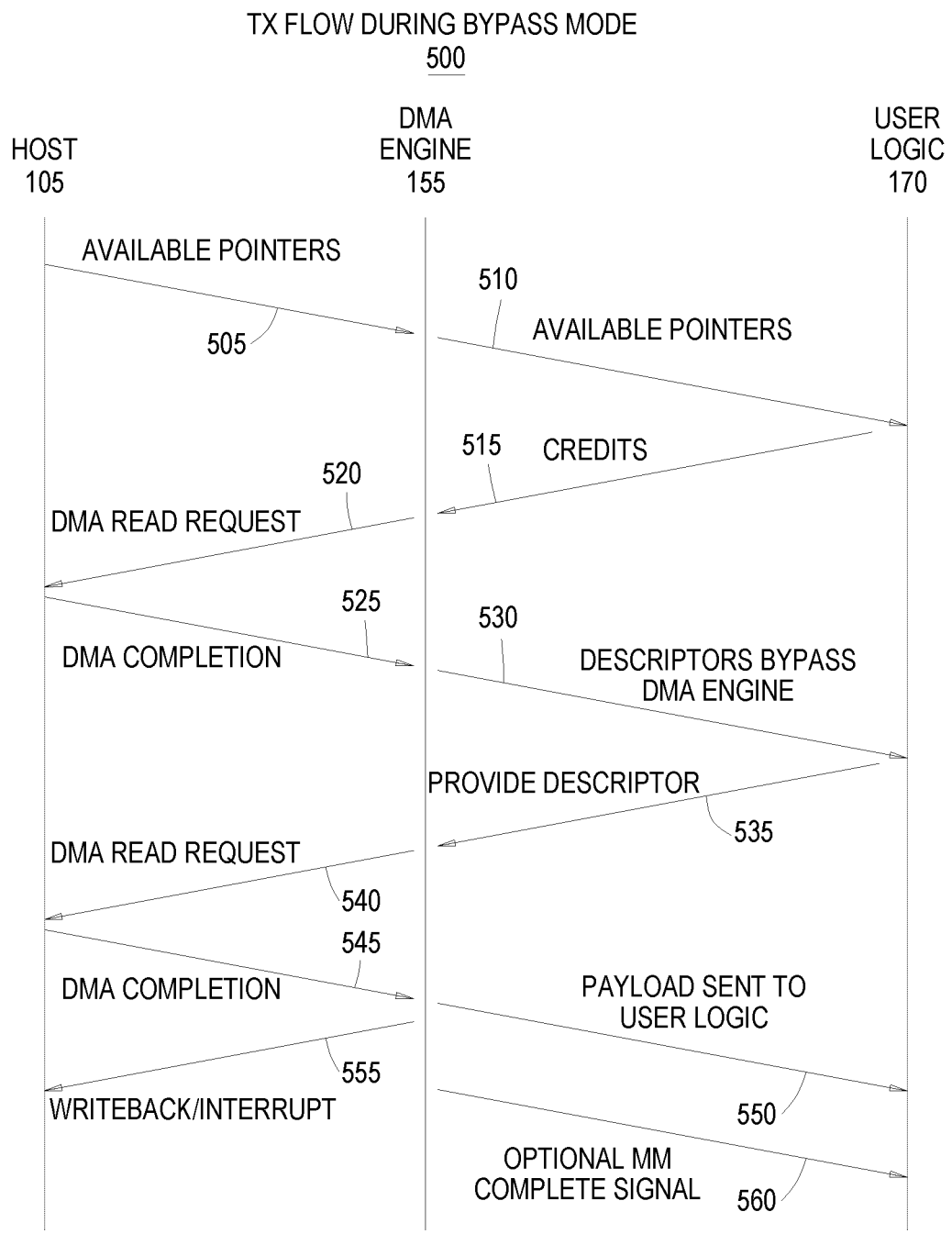
FIG. 5 illustrates a flow for performing a DMA write from a host to user logic, according to an example.

FIG. 5 illustrates a flow 500 for performing a DMA write from the host 105 to the user logic 170 using the DMA engine 155, according to an example. Arrow 505 illustrates the host 105 transmitting available pointers (or available descriptors) for a DMA queue to the DMA engine 155. In one example, the host 105 (e.g., an operating system executing in the host 105) maintains a TX DMA queue which has a descriptor ring and indices for determining available descriptors which include pointers to memory which can be used to perform a TX operation. Periodically or at intervals, the host 105 transmits the available pointers to the DMA engine 155.

In a bypass mode of operation, arrow 510 illustrates that the DMA engine 155 forwards the available pointers to the user logic 170 using, for example, the TX available pointers signal 305 of the DMA interface 175 shown in FIG. 3. Doing so informs the user logic 170 how much memory is available in the host 105 to perform the TX operation. In one example, the user logic 170 evaluates performance parameters such as its current workload, available processing power, memory usage, descriptor storage space, and the like to determine how many credits to issue to the DMA engine 155 as shown by arrow 515 using, for example, the TX credits signal 310 in FIG. 3. Put differently, the user logic 170 uses the credits to perform traffic management to make sure the user logic 170 does not receive more data from the host 105 than the user logic 170 can currently process. For example, there may be one hundred available descriptors in the DMA queue, but the user logic 170 may issue credits for only ten descriptors based on the current workload of the user logic 170.

Using the credits, the DMA engine 155 issues DMA read requests to the host 105 as shown by arrow 520. In one example, the host 105 fetches the descriptors that correspond to the DMA read request transmitted by the DMA engine 155. Further, the DMA read requests may correspond to the number of credits issued to the DMA engine 155 from the user logic 170. For example, the DMA engine 155 may transmit DMA read requests for only a portion of the data the host 105 wants to write into the memory of the user logic 170 (or the user logic 170 wants to read from the memory in the host 105) based on the number of credits issued by the user logic 170. In this manner, the user logic 170 rather than the DMA engine 155 can throttle and control data flow when performing the TX operation.

Arrow 525 illustrates the host 105 transmitting DMA completion data to the DMA engine 155. In one example, the DMA completion data includes descriptors corresponding to the DMA read requests sent by the DMA engine 155 as shown by arrow 520. Instead of processing the descriptors, in this example the descriptors bypass the DMA engine 155 as shown by the arrow 530 using, for example, the TX descriptors out signal 315 shown in FIG. 3. That is, the DMA engine 155 forwards the descriptors to the user logic 170 for processing. However, not shown, in a normal mode of operation, the DMA engine 155 may process the descriptors itself rather than using the DMA interface to forward the descriptors to the user logic 170 for processing.

As mentioned above, the different DMA queues may store descriptors that include pointers to memory or have descriptors that store immediate data rather than pointers to memory locations. For example, the host 105 may include multiple cores or multiple virtual machines which each have their own TX DMA queues. Each of these queues can use either descriptors that contain pointers or descriptors that contain immediate data. Moreover, the descriptors can include identifying data indicating which DMA queue they originate from thereby enabling the user logic 170 to determine the type of descriptor.

If the descriptor corresponds to a queue that transmits immediate data in the descriptor, the user logic 170 can fetch the data corresponding to the TX operation directly from the descriptor received from the DMA engine 155 as shown by the arrow 530. In this example, the flow 500 would end at arrow 530 since the payload corresponding to the TX operation was embedded in the descriptors themselves. The user logic 170 can store the immediate data payload thereby completing the DMA operation.

However, if the descriptor corresponds to a queue that embeds memory pointers in the descriptors rather than immediate data, the flow 500 continues with arrow 535 where the user logic 170 provides the descriptors back to the DMA engine 155 using, for example, the TX descriptors in signal 320 shown in FIG. 3. Doing so instructs the DMA engine 155 to fetch the data stored at the pointer in the descriptor. Thus, bypassing the DMA engine 155 to permit the user logic 170 to process the descriptors permits the user logic 170 to transmit immediate data using the descriptors. As such, the DMA engine 155 (which may be hardened) can be used with user logic 170 and hosts 105 that embed immediate data into the descriptors as well as those that do not. Further, because the DMA engine 155 does not process the descriptors, the formatting in the descriptors can change without affecting the operation of flow 500. That is, the host 105 and the user logic 170 which create and process the descriptors can change the format of the descriptors (e.g., change the amount of data stored in the descriptors, the type of identifying data in the descriptors, and the like) and still use the same DMA engine 155 since the engine 155 is bypassed.

Arrow 540 illustrates that the DMA engine 155 transmits a DMA read request to the host 105 indicating to the host 105 to provide the payload stored at the memory location pointed to by the descriptor. Arrow 545 illustrates that the host 105 completes the DMA operation by transmitting the payload to the DMA engine 155 which then sends the payload to the user logic 170 as shown by arrow 550. The DMA engine 155 can use either AXI or memory mapped signals to transmit the payload to the user logic 170. For example, the DMA engine 155 can use either the TX DMA AXI4 signals 325 or the memory mapped signals 360 and 365 to transmit the payload to the user logic 170. Once completed, the credits are returned to the user logic 107 which can then, if it decides is appropriate, issue more credits to the DMA engine 155 for performing more TX operations. As shown by the arrow 555, the user logic 170 can also change descriptor information which controls if a writeback is issued, the writeback contents are sent, and if an interrupt is generated after descriptor completion.

In memory mapped DMA, user logic 170 may want to know when the DMA of the provider request is complete. In other words, when the data was been copied from the host memory to the memory attached to the user logic 170. Thus, in this example, the flow 500 includes an additional arrow 560 from the DMA engine 155 to the host indicating that the DMA engine 155 has completed the memory mapped (MM) request. This message may be sent on the TX descriptor out signal 315. In one example of traffic management, the user logic 170 can defer the issuance of the provider descriptor until that flow gains enough credit to transmit.

Figure 6:
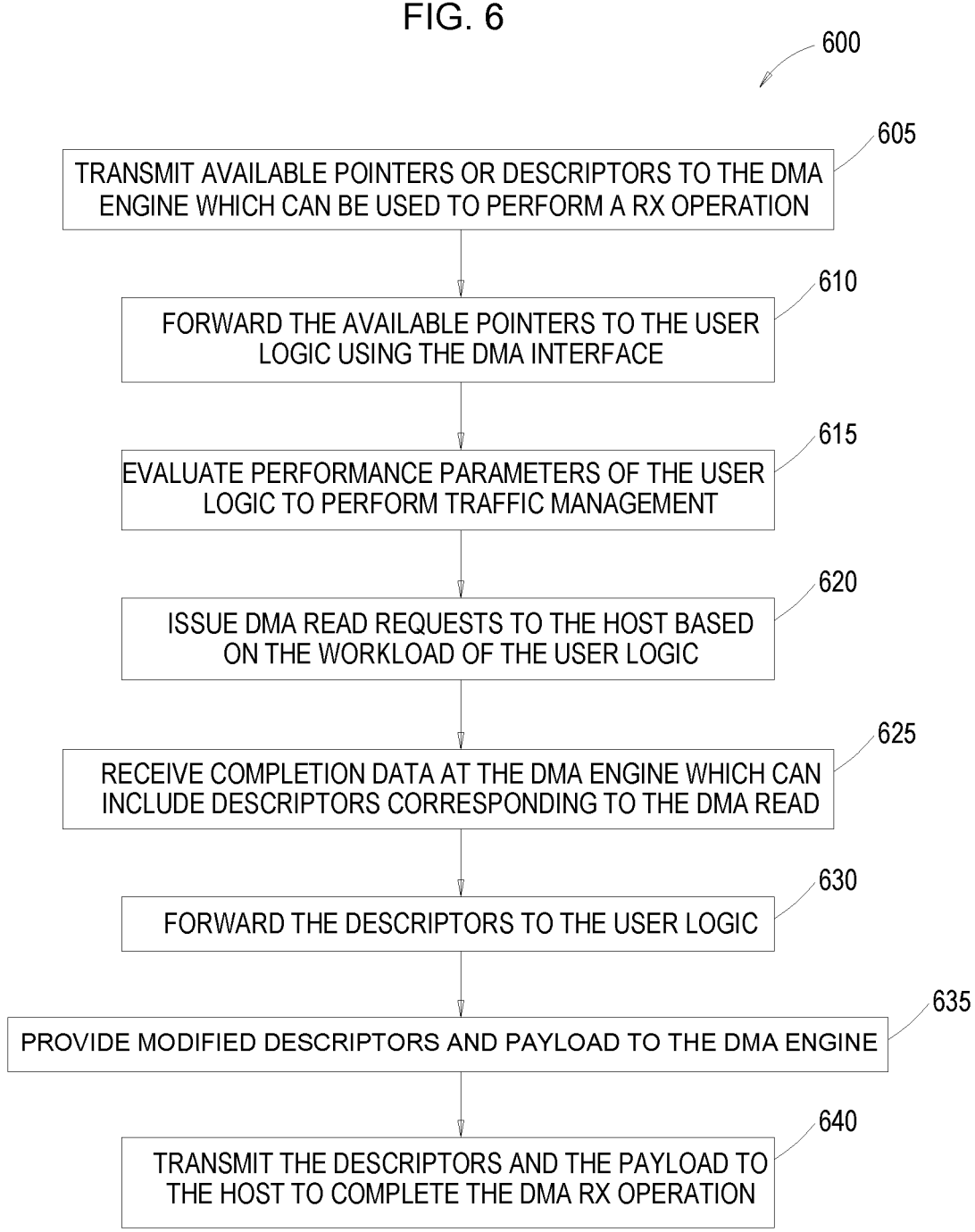
FIG. 6 illustrates a flow for performing a DMA write from user logic to a host, according to an example.

FIG. 6 illustrates a flow of a method 600 for performing a DMA write from user logic to a host—i.e., a RX operation—according to an example. At block 605, the host transmits available pointers to the DMA engine. At block 610, when in a bypass mode of operation, the DMA engine forwards the available pointers to the user logic using the DMA interface. At block 615, the user logic evaluates performance parameters such as its current workload, available processing power, memory usage, descriptor storage space, and the like to perform traffic management to ensure the user logic does not receive more data from the host than the user logic can currently process.

Based on the workload of the user logic, at block 620 the DMA engine issues DMA read requests to the host. At block 625, the host transmits DMA completion data to the DMA engine which can include descriptors corresponding to the DMA read requests sent by the DMA engine. At block 630, the DMA engine forwards the descriptors to the user logic. That is, instead of processing the descriptors, the descriptors bypass the DMA engine. At block 635, the user logic provides processed or modified descriptors and payload to the DMA engine to include pointers that point to the memory location storing the payload. At block 640, the DMA engine transmits the descriptors and the payload to the host to complete the DMA RX operation.

Figure 7:
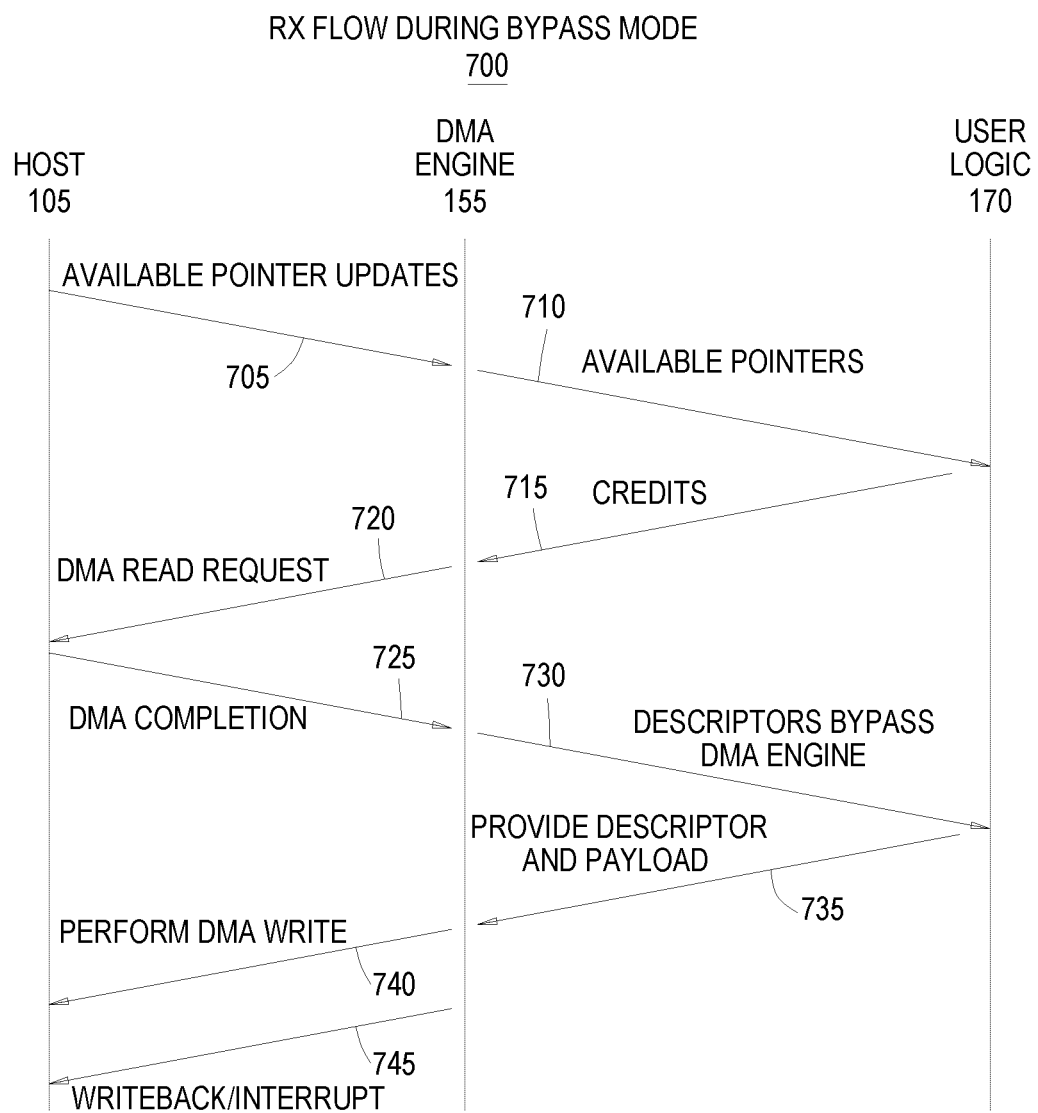
FIG. 7 illustrates a flow for performing a DMA write from user logic to a host, according to an example.

FIG. 7 illustrates a flow 700 for performing a DMA write from user logic to a host—i.e., a RX operation—according to an example. Arrow 705 illustrates the host 105 transmitting available pointers for a DMA queue to the DMA engine 155. In one example, the host 105 (e.g., an operating system executing in the host 105) maintains a RX DMA queue which has a descriptor ring and indices for determining available pointers to memory which can be used to perform a RX operation. Periodically or at predefined intervals, the host 105 transmits the available pointers or descriptors to the DMA engine 155.

In a bypass mode of operation, arrow 710 illustrates that the DMA engine 155 forwards the available pointers to the user logic 170 using, for example, the RX available pointers signal 330 of the DMA interface 175 shown in FIG. 3. Doing so informs the user logic 170 how much memory is available in the host 105 to perform the RX operation. Like in the flow 500, the user logic 170 can evaluate performance parameters such as its current workload, available processing power, memory usage, and the like to determine how many credits to issue to the DMA engine 155 as shown by arrow 515 using, for example, the RX credits signal 335 in FIG. 3. Put differently, the user logic 170 uses the credits to perform traffic management to make sure the user logic 170 does not commit to transmitting more data to the host 105 than the user logic 170 can currently handle.

Using the credits, the DMA engine 155 issues DMA read requests to the host 105 as shown by arrow 720. In one example, the host 105 fetches the descriptors that correspond to the DMA read request transmitted by the DMA engine 155. Further, the DMA read requests may correspond to the number of credits issued to the DMA engine 155 from the user logic 170. For example, the DMA engine 155 may transmit DMA read requests for only a portion of the data the host 105 wants to read from the memory of the user logic 170 (or the user logic 170 wants to write into the memory of the host 105) based on the number of credits issued by the user logic 170. In this manner, the user logic 170 rather than the DMA engine 155 can throttle and control data flow when performing the RX operation.

Arrow 725 illustrates the host 105 transmitting DMA completion data to the DMA engine 155. In one example, the DMA completion data includes descriptors corresponding to the DMA read requests sent by the DMA engine 155 as shown by arrow 720. Instead of processing the descriptors, in this example the descriptors bypass the DMA engine 155 as shown by the arrow 730 using, for example, the RX descriptors out signal 340 shown in FIG. 3. That is, the DMA engine 155 forwards the descriptors to the user logic 170 for processing. In one example, the user logic 170 buffers the descriptors before transmitting the processed descriptors back to the DMA engine 155. For example, the buffering may use a cache in the DMA engine 155 which can store multiple descriptors for multiple DMA queues. Alternatively, the user logic 170 can return a descriptor in synch with incoming packets or payloads which may avoid buffering.

In one example, because the user logic 170 processes the descriptors, the user logic 170 can perform a virtual to physical memory translation on the memory pointers stored in the descriptors. That is, when fetched from the DMA queues in the host 105, the descriptors may include virtual memory addresses to a virtual memory address space in the SOC. However, the user logic 170 can perform virtual to physical memory address translation and then insert the physical memory address of the payload in the SOC into the descriptors. This memory address translation can be performed in a system that uses RDMA over Converged Ethernet (RoCE) (where RDMA is Remote Direct Memory Access) or iWARP.

Arrow 735 illustrates that the user logic 170 provides the descriptors and payload to the DMA engine 155 using, for example, the RX descriptors in signal 345 shown in FIG. 3. In one example, the user logic 170 modifies the descriptors received from the DMA engine 155 to include pointers that point to the memory location storing the payload. The user logic 170 may use the AXI or memory mapped signals in the DMA interface to transfer the payload to the DMA engine 155. Alternatively, if the descriptors correspond to a queue that uses immediate data, the user logic 170 embeds the payload into the descriptors. Arrow 740 illustrates the DMA engine 155 performing the DMA write by transmitting the descriptors and the payload to the host 105 to complete the DMA operation. Once completed, the credits are returned to the user logic 107 which can then, if it decides is appropriate, issue more credits to the DMA engine 155 for performing more RX operations. Arrow 745 illustrates that a writeback or interrupt may be sent from the DMA engine 155 to the host 105.

Figure 8:
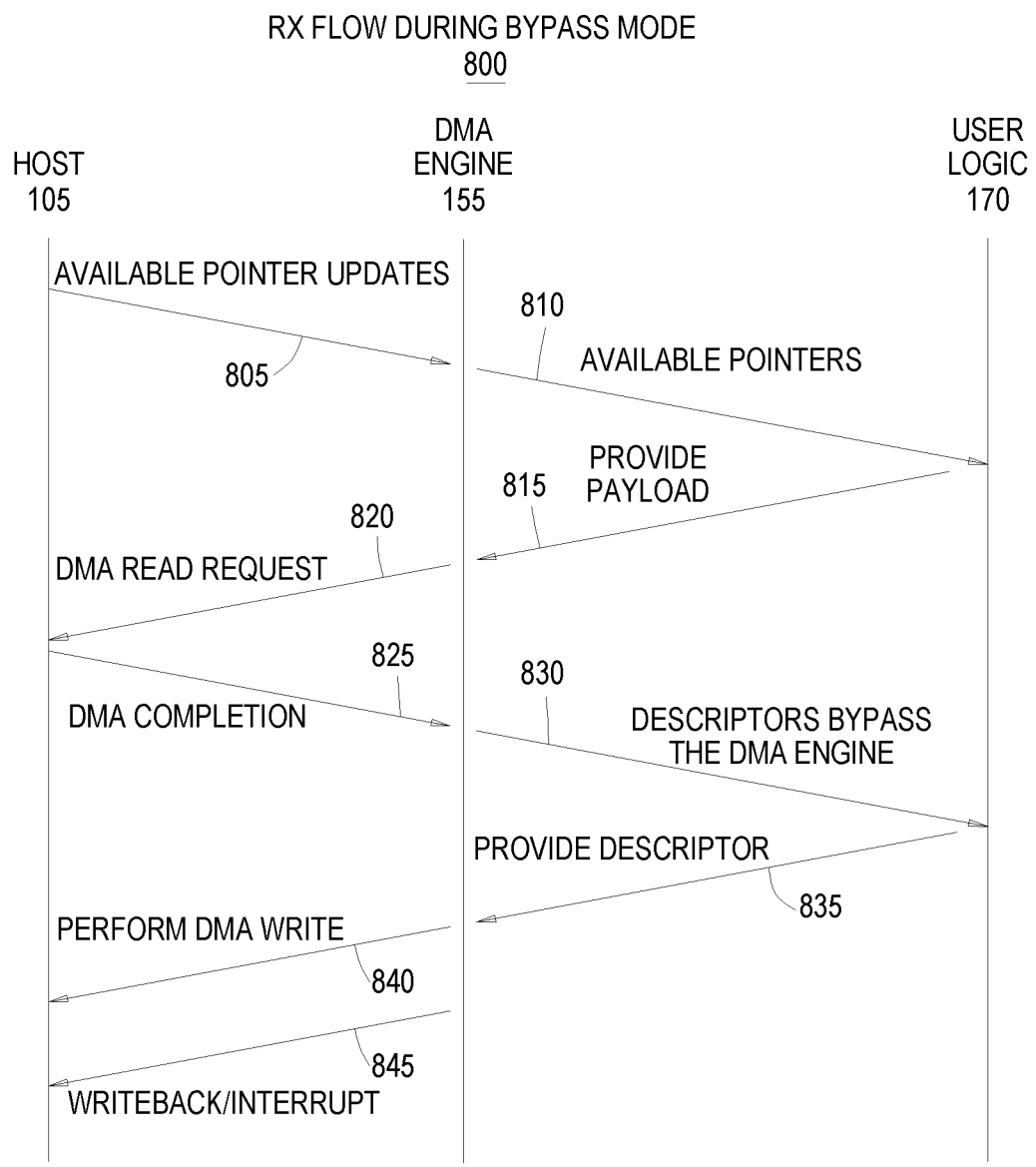
FIG. 8 illustrates a flow for performing a DMA write from user logic to a host, according to an example.

FIG. 8 illustrates a flow 800 for performing a DMA write from user logic to a host—i.e., a RX operation—according to an example. The arrows 805 and 810 in FIG. 8 may be the same as the arrows 705 and 710 in FIG. 7, and thus, will not be described in detail.

Arrow 815 illustrates the user logic 170 providing a payload corresponding to the RX operation to the DMA engine 155 using either the AXI or memory mapped signals in the DMA interface. Thus, instead of issuing credits to the DMA engine 155, in this example, the user logic 170 permits the hardware in the DMA engine 155 to perform traffic regulation (e.g., issuing and maintaining credits). The advantage of doing so is the user logic 170 can avoid buffering the descriptors like what may be done in the flow 700 in FIG. 7 which can reduce the amount of storage in the user logic 170 used to perform DMA operations. By providing the payload corresponding to the RX operation to the DMA engine 155, the engine 155 knows the size of the payload, and thus, how many descriptors are needed to transmit the payload to the host 105.

Arrow 820 illustrates the DMA engine 155 performing the DMA read request to fetch the descriptors and receiving the DMA completion data from the host 105 as shown by arrow 825. These steps may be the same as arrows 720 and 725 in the flow 700.

Arrow 830 illustrates the user logic 170 receiving the descriptors from the DMA engine 155. However, because the DMA logic performs traffic management, the user logic 170 may not buffer the descriptors. That is, the user logic can process the descriptors (e.g., perform virtual to physical address translation) without buffering. Doing so may increase the latency since the descriptors needs to be fetched by the DMA engine 155, but this latency can be reduced if the user logic provides the prefetch hints using, for example, the RX prefetch hint signal 350 in FIG. 3. If, however, the DMA engine 155 prefetches the descriptor but the user logic 170 is too busy to process the descriptor, the DMA engine 155 can discard the descriptor and issue a negative credit and fetch the descriptor later. In another example, the DMA engine 155 can perform pointer rollback when the engine 155 discards a descriptor it has already prefetched by rolling back a pointer.

Arrow 835 illustrates the user logic 170 providing the processed descriptors to the DMA engine 155 which the engine 155 can then use to perform the DMA write to the host 105 as shown by arrow 840. Once completed, the DMA engine 155 can issue an additional credit for performing an RX operation. Arrow 845 illustrates that a writeback or interrupt may be sent from the DMA engine 155 to the host 105.

In the preceding, reference is made to examples presented in this disclosure. However, the scope of the present disclosure is not limited to specific described examples. Instead, any combination of the features and elements described herein, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the aspects, features, examples and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware example, an entirely software example (including firmware, resident software, microcode, etc.) or an example combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to examples of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method of operating a DMA engine, the method comprising:
    receiving a first descriptor from a host at the DMA engine;
    forwarding, in a bypass mode of operation, the first descriptor from the DMA engine to receiving logic using a DMA interface, wherein the receiving logic configures the DMA interface to operate in different modes of operation, the different modes of operation comprising the bypass mode of operation and a first mode of operation, wherein in the bypass mode of operation, the DMA engine does not process the first descriptor and in the first mode of operation, the DMA engine does process the first descriptor; and
    determining at the receiving logic whether the first descriptor contains one of: a payload corresponding to a first DMA operation and a memory pointer to the payload.

2. The method of claim 1, further comprising:
    receiving a plurality of available descriptors for performing the first DMA operation to the DMA engine, wherein the DMA engine forwards the available descriptors to the receiving logic using the DMA interface.

3. The method of claim 2, further comprising:
    issuing credits to the DMA engine in response to receiving the plurality of available descriptors, wherein, before forwarding the first descriptor to the receiving logic, the DMA engine is configured to use at least one of the credits to transmit a request to the host to fetch the first descriptor.

4. The method of claim 3, further comprising:
    determining a number of the credits to issue to the DMA engine based on a performance parameter of the receiving logic.

5. The method of claim 2, wherein the first DMA operation comprises writing data stored in a system on a chip into the host, wherein the receiving logic is configured to provide a prefetch hint to the DMA engine in response to receiving the plurality of available descriptors, wherein the prefetch hint indicates at least one descriptor in the available descriptors to prefetch from a DMA queue.

6. The method of claim 2, further comprising:
    providing the payload corresponding to the first DMA operation in response to receiving the available descriptors, wherein the payload is provided before the DMA engine transmits the first descriptor to the receiving logic; and
    process the first descriptor without buffering the first descriptor in a cache containing multiple descriptors received from the DMA engine.

7. The method of claim 1, wherein the first descriptor contains immediate data corresponding to respective payload, wherein the method comprises:
    completing the first DMA operation without forwarding the first descriptor back to the DMA engine.

8. The method of claim 1, wherein the first descriptor stores a respective pointer to memory, wherein the method comprises:
    forwarding the first descriptor back to the DMA engine from the receiving logic, wherein the DMA engine transmits a DMA instruction to the host using the first descriptor.

9. The method of claim 8, further comprising:
    performing a virtual to physical memory address translation on the respective pointer in the first descriptor before forwarding the first descriptor back to the DMA engine.

10. The method of claim 1, further comprising:
    receiving a plurality of descriptors at the DMA engine from the host, wherein the plurality of descriptors comprises a streaming format and a memory mapped format, wherein the descriptors with the streaming format correspond to data that is written or read from the DMA interface while the descriptors with the memory mapped format correspond to data that is written or read from memory in an integrated circuit comprising the DMA engine and the receiving logic.

11. A system on a chip (SOC), comprising:
    a DMA engine comprising circuitry;
    user logic; and
    a DMA interface communicatively coupling the DMA engine to the user logic, wherein the user logic configures the DMA interface to operate in different modes of operation, the different modes of operation comprising the bypass mode of operation and a first mode of operation, wherein in the bypass mode of operation, the DMA engine does not process the first descriptor and in the first mode of operation, the DMA engine does process the first descriptor,
    wherein in a bypass mode of operation of the plurality of transmitting modes of operation, the DMA engine is configured to forward, using the DMA interface, a first descriptor received from a host to the user logic, and
    wherein the user logic evaluates the first descriptor to determine whether the first descriptor contains one of: a payload corresponding to a first DMA operation and a memory pointer to the payload.

12. The SOC of claim 11, wherein the DMA engine is configured to receive available descriptors available for performing the first DMA operation and forward the available descriptors to the user logic using the DMA interface.

13. The SOC of claim 12, wherein the user logic is configured to issue credits to the DMA engine in response to receiving the available descriptors, wherein, before forwarding the first descriptor to the user logic, the DMA engine is configured to use at least one of the credits to transmit a request to a host to fetch the first descriptor.

14. The SOC of claim 13, wherein the user logic is configured to determine the number of the credits to issue to the DMA engine based on a performance parameter of the user logic.

15. The SOC of claim 14, wherein the user logic is configured to:

provide a payload corresponding to the first DMA operation in response to receiving the available descriptors, wherein the payload is provided before the DMA engine transmits the first descriptor to the user logic; and process the first descriptor without buffering the first descriptor in a cache containing multiple descriptors received from the DMA engine.

16. The SOC of claim 11, wherein the first descriptor stores immediate data corresponding to the payload, wherein the user logic is configured to complete the first DMA operation without forwarding the first descriptor back to the DMA engine.

17. The SOC of claim 11, wherein the first descriptor stores a respective pointer to memory, wherein the user logic is configured to forward the first descriptor back to the DMA engine using the DMA interface, wherein the DMA engine transmits a DMA instruction to a host using the first descriptor.

18. The SOC of claim 11, wherein the user logic is configured to perform a virtual to physical memory address translation on the respective pointer in the first descriptor before forwarding the first descriptor back to the DMA engine.

19. The SOC of claim 11, further comprising:

a hardware card, wherein the user logic comprises programmable logic disposed in the hardware card and the DMA engine is hardened such that the circuitry comprises non-programmable logic disposed in the hardware card.

20. The SOC of claim 11, wherein the DMA engine is configured to receive a plurality of descriptors from the host, wherein the plurality of descriptors comprises a streaming format and a memory mapped format, wherein the descriptors with the streaming format correspond to data that is written or read from the DMA interface while the descriptors with the memory mapped format correspond to data that is written or read from memory in an integrated circuit comprising the DMA engine and the receiving logic.

* * * * *

UNITED STATES PATENT AND TRADEMARK OFFICE
CERTIFICATE OF CORRECTION

PATENT NO. : 10,983,920 B2
APPLICATION NO. : 15/892266
DATED : April 20, 2021
INVENTOR(S) : Chandrasekhar S. Thyamagondlu et al.

It is certified that error appears in the above-identified patent and that said Letters Patent is hereby corrected as shown below:

In the Claims

Column 16, Line 41, In Claim 11, after "interface" insert -- signals --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*